(12) United States Patent
Uchida et al.

(10) Patent No.: US 11,873,887 B2
(45) Date of Patent: Jan. 16, 2024

(54) POWER TRANSMISSION DEVICE

(71) Applicant: MUSASHI SEIMITSU INDUSTRY CO., LTD., Toyohashi (JP)

(72) Inventors: Akihiro Uchida, Toyohashi (JP); Akuto Sekiguchi, Toyohashi (JP); Tetsuya Okabe, Toyohashi (JP)

(73) Assignee: Musashi Seimitsu Industry Co., Ltd., Aichi (JP)

( * ) Notice: Subject to any disclaimer, the term of this patent is extended or adjusted under 35 U.S.C. 154(b) by 157 days.

(21) Appl. No.: 17/617,187

(22) PCT Filed: Jun. 26, 2020

(86) PCT No.: PCT/JP2020/025283
§ 371 (c)(1),
(2) Date: Dec. 7, 2021

(87) PCT Pub. No.: WO2020/262627
PCT Pub. Date: Dec. 30, 2020

(65) Prior Publication Data
US 2022/0235857 A1 Jul. 28, 2022

(30) Foreign Application Priority Data
Jun. 28, 2019 (JP) ................................ 2019-122192

(51) Int. Cl.
*F16H 48/40* (2012.01)
*F16H 55/17* (2006.01)
*F16H 48/08* (2006.01)

(52) U.S. Cl.
CPC ............. *F16H 48/40* (2013.01); *F16H 55/17* (2013.01); *F16H 48/08* (2013.01)

(58) Field of Classification Search
CPC .......... F16H 55/17; F16H 48/08; F16H 48/40; F16H 2048/385
See application file for complete search history.

(56) References Cited

U.S. PATENT DOCUMENTS 8,710,393 B2 * 4/2014 Okumura ............. B23K 11/093
219/78.16
10,036,462 B2 * 7/2018 Wilson .................... F16H 48/40
(Continued)

FOREIGN PATENT DOCUMENTS

CN 103119333 A 5/2013
JP 2011-169444 A 9/2011
(Continued)

OTHER PUBLICATIONS

Office Action, Notice of Reasons for Refusal, dated Mar. 1, 2023, issued in the corresponding Japanese Patent Application 2019-122192 with the English translation thereof.
(Continued)

*Primary Examiner* — Huan Le
(74) *Attorney, Agent, or Firm* — Carrier, Shende & Associated P.C.; Fulchand P. Shende; Joseph P. Carrier (57) ABSTRACT

In a power transmission device in which a hub portion of a ring gear is fixed by a weld portion to a flange portion on an outer periphery of a transmission member, a positioning outer peripheral part of an outer periphery of the flange portion has a radial direction positioning face that positions the hub portion in a radial direction with respect to the flange portion, and an axial direction positioning face that positions in an axial direction, a first annular recess part is provided in the positioning outer peripheral part, the first annular recess part alleviating stress caused by a pushing load via which the positioning projecting part pushes the radial direction positioning face due to the hub portion receiving a tensile force inward in the radial direction accompanying thermal shrinkage of the weld portion between a first outer peripheral part and the hub portion.

8 Claims, 6 Drawing Sheets

(56) References Cited

U.S. PATENT DOCUMENTS

| | | | |
|---|---|---|---|
| 10,125,855 B2 | 11/2018 | Yanase | |
| 10,487,932 B2 * | 11/2019 | Wilson | F16H 48/40 |
| 10,591,040 B2 * | 3/2020 | Yanase | F16H 48/40 |
| 2013/0195545 A1 | 8/2013 | Tsuchida et al. | |
| 2014/0083191 A1 * | 3/2014 | Iwatani | G01N 29/04 |
| | | | 403/272 |

FOREIGN PATENT DOCUMENTS

| | | |
|---|---|---|
| JP | 2013-018035 A | 1/2013 |
| JP | 2014-057970 A | 4/2014 |
| JP | 2016-188657 A | 11/2016 |
| WO | 2012/039014 A1 | 3/2012 |
| WO | 2017/050375 A1 | 3/2017 |
| WO | 2019/044749 A1 | 3/2019 |

OTHER PUBLICATIONS

First Office Action dated Jun. 29, 2023 issued in the corresponding Chinese Patent Application No. 202080046805.3 with the English machine translation thereof.

Office Action dated Aug. 23, 2023 issued in the corresponding Japanese Patent Application No. 2019-122192 with the English machine translation thereof.

* cited by examiner

COMPARATIVE EXAMPLE

POWER TRANSMISSION DEVICE

TECHNICAL FIELD

The present invention relates to a power transmission device, and in particular to a power transmission device that includes a transmission member that has a radially outward facing flange portion on an outer periphery thereof and is rotatable, and a ring gear that has on an inner periphery thereof a hub portion surrounding the flange portion, an outer peripheral face of the flange portion having at least a first outer peripheral part that extends further inward in an axial direction than a side face, on one side in the axial direction, of the flange portion and has fitted and welded thereto an inner peripheral face of the hub portion, and a positioning outer peripheral part with which a positioning projecting part projectingly provided on an inner peripheral face of the hub portion further on the other side in the axial direction than the first outer peripheral part is engaged, and which positions the hub portion in the radial and axial directions with respect to the flange portion.

In the present invention and the present specification, the 'axial direction' means a direction along the rotational axis (in the embodiment a first axis) of a transmission member, and in particular 'further inward than a side face in the axial direction' means, with reference to the side face, inward in the axial direction, that is, the thickness direction, of a flange portion having the side face. Furthermore, the 'radial direction' means the direction of a radius whose central axis is the rotational axis of a transmission member.

BACKGROUND ART

The power transmission device is already known, as disclosed in for example Patent Document 1 below.

PRIOR ART DOCUMENTS

Patent Documents patent Document 1: Japanese patent Application Laid-open No. 2016-188657

SUMMARY OF THE INVENTION

Problems to be Solved by the Invention

In the power transmission device of Patent Document 1, a weld portion between a first outer peripheral part of a flange portion of the transmission member and a hub portion of a ring gear undergoes thermal expansion at the time of welding, and then undergoes thermal shrinkage after being welded, and the hub portion in particular is thereby exposed to a large tensile force toward the weld portion side, that is, inward in the radial direction. The tensile force pushes a positioning projecting part on the inner periphery of the hub portion against a positioning outer peripheral part of the flange portion, but since displacement of the positioning projecting part is strongly restricted by the positioning outer peripheral part, there is a tendency for a relatively high residual stress to be produced in an axially inner end part or a part therearound of the weld portion, which is the origin of tension in the hub portion.

Figure 4:
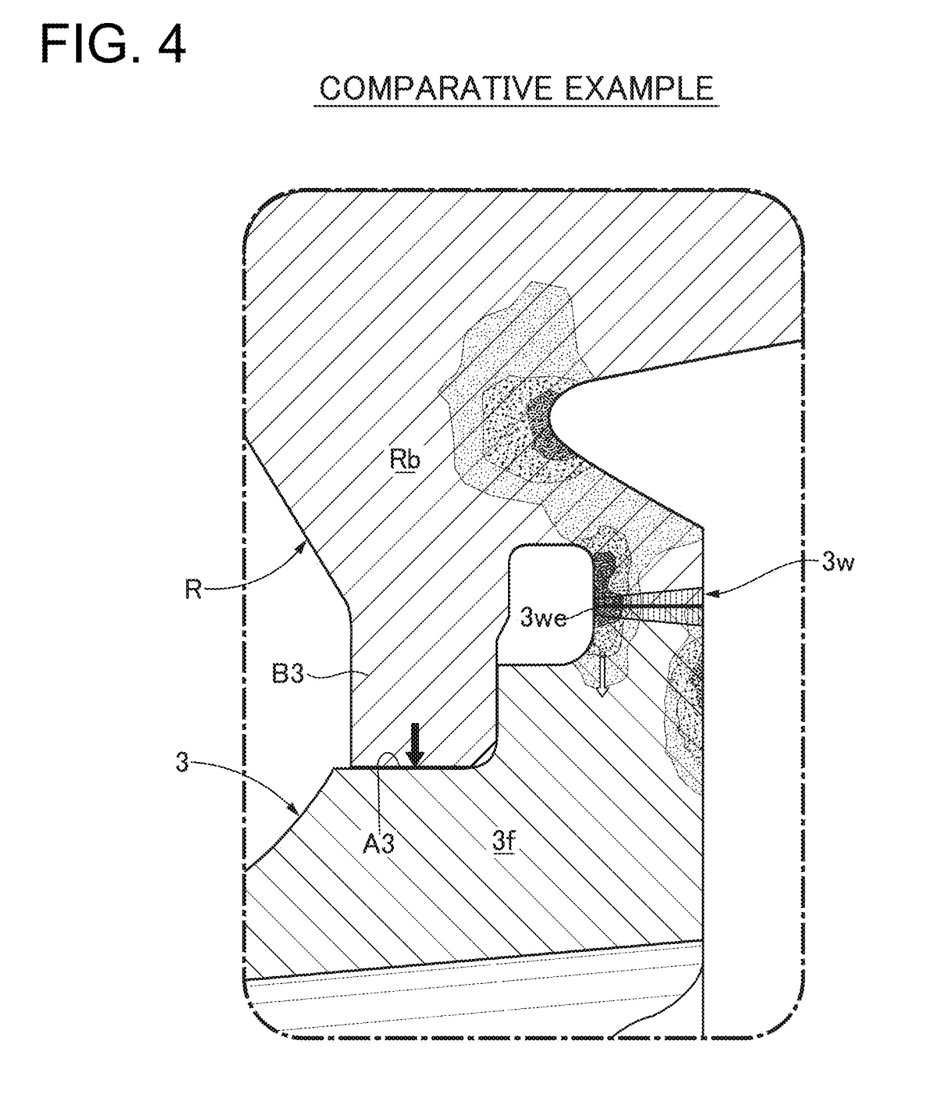
FIG. 4 is a sectional view, corresponding to FIG. 3, showing a Comparative Example.

FIG. 4 shows one example of a residual stress distribution determined by computer simulation analysis for a Comparative Example of the same type as that of the above differential device. In this figure, a pale grey part denotes an area where residual stress occurs, and the darker the tone, the larger the residual stress.

The present invention has been accomplished in light of the above circumstances, and it is an object thereof to provide a power transmission device that can alleviate the residual stress with a simple structure.

Means for Solving the Problems

In order to attain the above object, according to a first aspect of the present invention, there is provided a power transmission device comprising a transmission member that has a radially outward facing flange portion on an outer periphery thereof and is rotatable, and a ring gear that has on an inner periphery thereof a hub portion surrounding the flange portion, an outer peripheral face of the flange portion having at least a first outer peripheral part that extends further inward in an axial direction than a side face, on one side in the axial direction, of the flange portion and has fitted and welded thereto an inner peripheral face of the hub portion, and a positioning outer peripheral part with which a positioning projecting part projectingly provided on an inner peripheral face of the hub portion is engaged further on the other side in the axial direction than the first outer peripheral part, characterized in that the positioning outer peripheral part has at least a radial direction positioning face that has fitted or press fitted thereto an inner peripheral face of the positioning projecting part so as to position the hub portion in a radial direction with respect to the flange portion, and an axial direction positioning face against which a side face, on the first outer peripheral part side, of the positioning projecting part abuts so as to position the hub portion in the axial direction with respect to the flange portion, a first annular recess part is provided in the positioning outer peripheral part so as to be recessed at least further toward a weld portion side in the axial direction than the axial direction positioning face, the first annular recess part alleviating stress caused by a pushing load via which the positioning projecting part pushes the radial direction positioning face due to the hub portion receiving a tensile force inward in the radial direction accompanying thermal shrinkage of the weld portion between the first outer peripheral part and the hub portion, and residual stress produced in the axially inner end portion of the weld portion in relation to the hub portion receiving the tensile force accompanying the thermal shrinkage can be alleviated by the first annular recess part reducing the stress due to the pushing load.

In order to attain the above object likewise, according to a second aspect of the present invention, there is provided a power transmission device comprising a transmission member that has a radially outward facing flange portion on an outer periphery thereof and is rotatable, and a ring gear that has on an inner periphery thereof a hub portion surrounding the flange portion, an outer peripheral face of the flange portion having at least a first outer peripheral part that extends further inward in an axial direction than a side face, on one side in the axial direction, of the flange portion and has fitted and welded thereto an inner peripheral face of the hub portion, and a positioning outer peripheral part with which a positioning projecting part projectingly provided on an inner peripheral face of the hub portion is engaged further on the other side in the axial direction than the first outer peripheral part, characterized in that the positioning outer peripheral part has at least a radial direction positioning face that has fitted or press fitted thereto an inner peripheral face of the positioning projecting part so as to position the hub portion in a radial direction with respect to the flange portion, and an axial direction positioning face against which a side face, on the first outer peripheral part side, of the positioning projecting part abuts so as to position the hub portion in the axial direction with respect to the flange portion, a second annular recess part is provided in a side face, on the other side in the axial direction, of the hub portion so that at least part thereof overlaps the positioning projecting part, the second annular recess part alleviating a pushing load via which the positioning projecting part pushes the radial direction positioning face due to the hub portion receiving a tensile force inward in the radial direction accompanying thermal shrinkage of a weld portion between the first outer peripheral part and the hub portion, and residual stress produced in the axially inner end portion of the weld portion in relation to the hub portion receiving the tensile force accompanying the thermal shrinkage can be alleviated by the second annular recess part reducing the pushing load.

Further, according to a third aspect of the present invention, in addition to the first or second aspect, a radial clearance is disposed between mutually opposing faces of the positioning outer peripheral part and the inner peripheral face of the positioning projecting part further toward the weld portion side in the axial direction than the radial direction positioning face, the radial clearance putting the mutually opposing faces out of contact with each other.

Furthermore, according to a fourth aspect of the present invention, in addition to the third aspect, the radial clearance is formed by setting back a part of the positioning projecting part further outward in the radial direction than the radial direction positioning face.

Moreover, according to a fifth aspect of the present invention, in addition to the first aspect, a radial clearance is disposed, further toward the weld portion side in the axial direction than the radial direction positioning face, between mutually opposing faces of the positioning outer peripheral part and the inner peripheral face of the positioning projecting part, the radial clearance putting the mutually opposing faces out of contact with each other, and the radial clearance is formed by setting back a part of the positioning outer peripheral part further inward in the radial direction than the radial direction positioning face and communicates directly with the first annular recess part.

Further, according to a sixth aspect of the present invention, in addition to the second aspect, the second annular recess part partially coincides with the radial direction positioning face in the axial direction.

In the present invention, 'fit' includes not only a case in which an inner peripheral face of the positioning projecting part is fitted to a radial direction positioning face without a gap but also a case in which they are fitted via a slight gap. In the case of the latter, the gap is set to an order of magnitude such that due to the hub portion receiving the radially inward tensile force accompanying thermal shrinkage of the weld portion the slight gap disappears and the positioning projecting part can directly push the radial direction positioning face.

Effects of the Invention

In accordance with the first aspect, in the power transmission device in which the outer peripheral face of the flange portion of the transmission case has the first outer peripheral part, which extends further inward in the axial direction than the side face, on the one side in the axial direction, of the flange portion and has fitted and welded thereto an inner peripheral face of the hub portion of the ring gear, and the positioning outer peripheral part, with which the positioning projecting part projectingly provided on the inner peripheral face of the hub portion further on the other side in the axial direction than the first outer peripheral part is engaged and which positions the hub portion in the radial and axial directions with respect to the flange portion, the first annular recess part is provided in the positioning outer peripheral part so as to be recessed at least further toward the weld portion side than the axial direction positioning face, the first annular recess part alleviating stress caused by a pushing load via which the positioning projecting part pushes the radial direction positioning face of the positioning outer peripheral part due to the hub portion receiving a tensile force inward in the radial direction accompanying thermal shrinkage of the weld portion between the first outer peripheral part and the hub portion, and residual stress produced in the axially inner end portion of the weld portion in relation to the hub portion receiving the tensile force accompanying the thermal shrinkage can be alleviated by the first annular recess part reducing the stress due to the pushing load. In this way, since the residual stress can be alleviated by alleviating effectively the pushing load with a simple structure in which only the first annular recess part is specially provided at a specified position of the outer peripheral part of the flange portion, it becomes possible for the transmission member to prevent effectively the occurrence of delayed fracture due to high residual stress.

Furthermore, in accordance with the second aspect, in the power transmission device, the second annular recess part reducing the pushing load is provided in the side face, on the other side in the axial direction, of the hub portion so as to at least partially overlap the positioning projecting part, and it becomes possible by decreasing the pushing load by means of the second annular recess part to alleviate residual stress produced in the axially inner end part of the weld portion in relation to the hub portion receiving a tensile force accompanying thermal shrinkage. In this way, since the residual stress can be alleviated by alleviating effectively the pushing load with a simple structure in which only the second annular recess part is specially provided at a specified position of the side face, on the other side in the axial direction, of the hub portion, it becomes possible for the transmission member to prevent effectively the occurrence of delayed fracture due to high residual stress.

Moreover, in accordance with each of the third and fifth aspects, since the radial clearance is disposed between the mutually opposing faces of the positioning outer peripheral part and the inner peripheral face of the positioning projecting part further toward the weld portion side in the axial direction than the radial direction positioning face of the positioning outer peripheral part, the radial clearance putting the mutually opposing faces out of contact with each other, it is possible to space the weld portion and the inner end, on the weld portion side, of the radial direction positioning face in the axial direction. Because of this, even if the positioning projecting part receives a large pushing reaction force from the radial direction positioning face, the stress is dispersed over a relatively long region in the axial direction from a portion of the positioning projecting part that abuts against the radial direction positioning face to the weld portion, and it therefore becomes possible to alleviate effectively residual stress produced in the inner end portion of the weld portion and the vicinity thereof.

Furthermore, in accordance with the fourth aspect in particular, since the radial clearance is formed by setting back a part of the positioning projecting part further outward in the radial direction than the radial direction positioning face, the contact area between the inner peripheral face of the positioning projecting part and the radial direction positioning face can be decreased by an area corresponding to the setting back, and the inner peripheral face can thus be easily distorted in the compression direction, thus enabling the pushing reaction force to be absorbed and thereby further dispersing the stress by means of the positioning projecting part. This enables the occurrence of residual stress in the axially inner end portion of the weld portion and a part therearound to be alleviated effectively.

Moreover, in accordance with the fifth aspect in particular, since the radial clearance is formed by setting back a part of the positioning outer peripheral part further inward in the radial direction than the radial direction positioning face, and communicates directly with the first annular recess part, it is possible to easily form the first annular recess part, which is set back further toward the weld portion side than the axial direction positioning face in the axial direction, and the radial clearance, which is set back further inward in the radial direction than the radial direction positioning face as one continuous annular concave face.

Furthermore, in accordance with the sixth aspect in particular, since the second annular recess part is present at a position in which it partially coincides with the radial direction positioning face of the positioning outer peripheral part in the axial direction, a part, corresponding to the radial direction positioning face, of the positioning projecting part, on which the reaction force directly acts when the positioning projecting part imposes a pushing load on the radial direction positioning face (in particular, a part coinciding with the second annular recess part in the axial direction) is easily distorted and deformed by the second annular recess part being specially provided, and it is therefore possible to further alleviate residual stress produced in the inner end of the weld portion and the vicinity thereof.

EXPLANATION OF REFERENCE NUMERALS AND SYMBOLS

A1, A2 First and second outer peripheral parts
A3 Positioning outer peripheral part
A3a Axial direction positioning face of positioning outer peripheral part
A3c Part of positioning outer peripheral part
A3r Radial direction positioning face of positioning outer peripheral part
B3 Positioning projecting part
B3c Part of positioning projecting part
B3i Inner peripheral face of positioning projecting part
B3s Side face of positioning projecting part
C Radial clearance
G1, G2 First and second annular recess parts
R Ring gear
Rb Hub portion
sf1 First side face as side face on one side in axial direction of flange portion
sr2 Second side face as side face on other side in axial direction of hub portion
3 Differential case as transmission member
3f Flange portion
3w Weld portion
3we Axially inner end part of weld portion
10 Differential device as power transmission device

MODES FOR CARRYING OUT THE INVENTION

Embodiments of the present invention are explained below by reference to the attached drawings.

Figure 1:
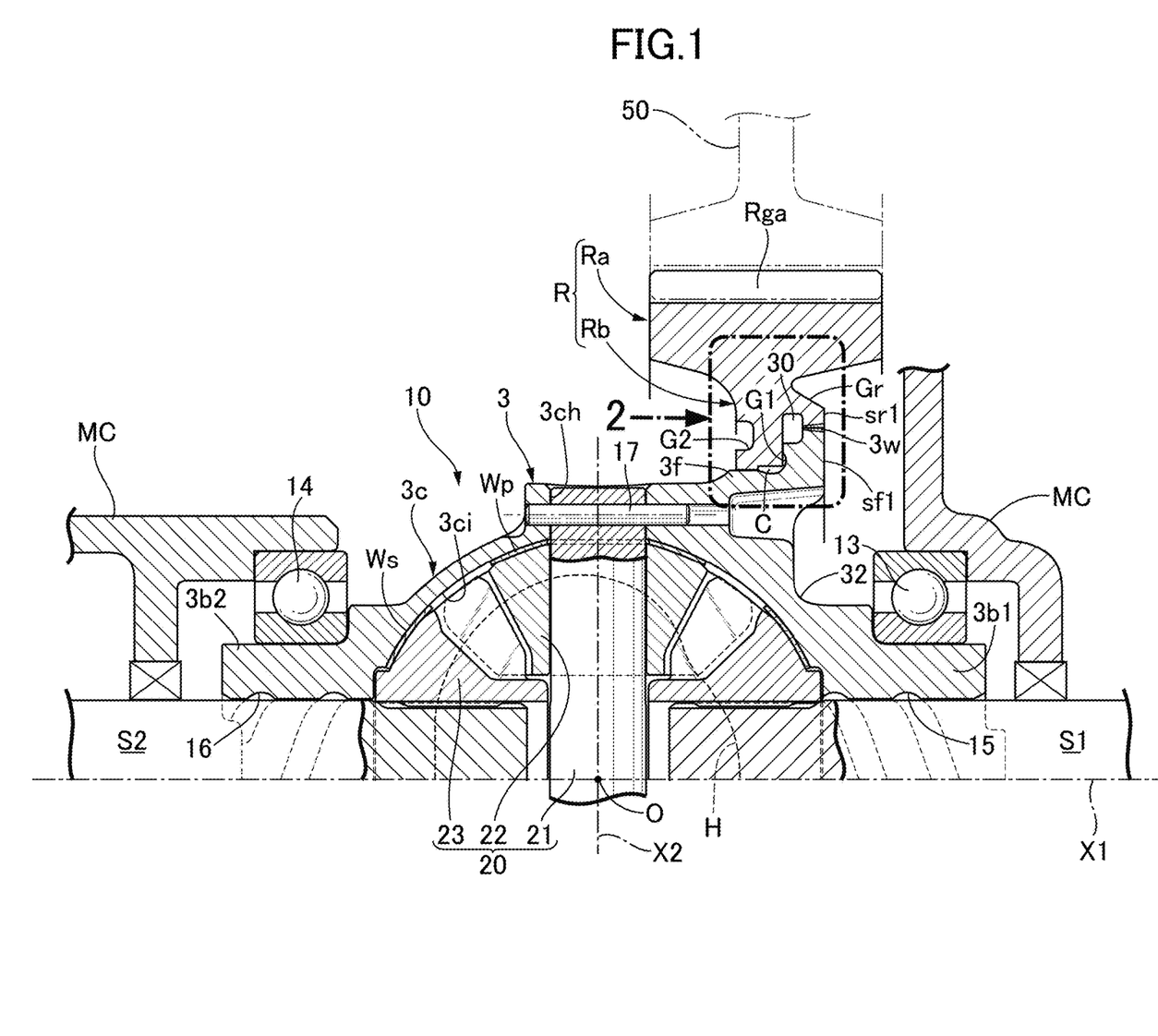
FIG. 1 is a sectional view of an essential part showing a differential device related to a first embodiment of the present invention.
Figure 2:
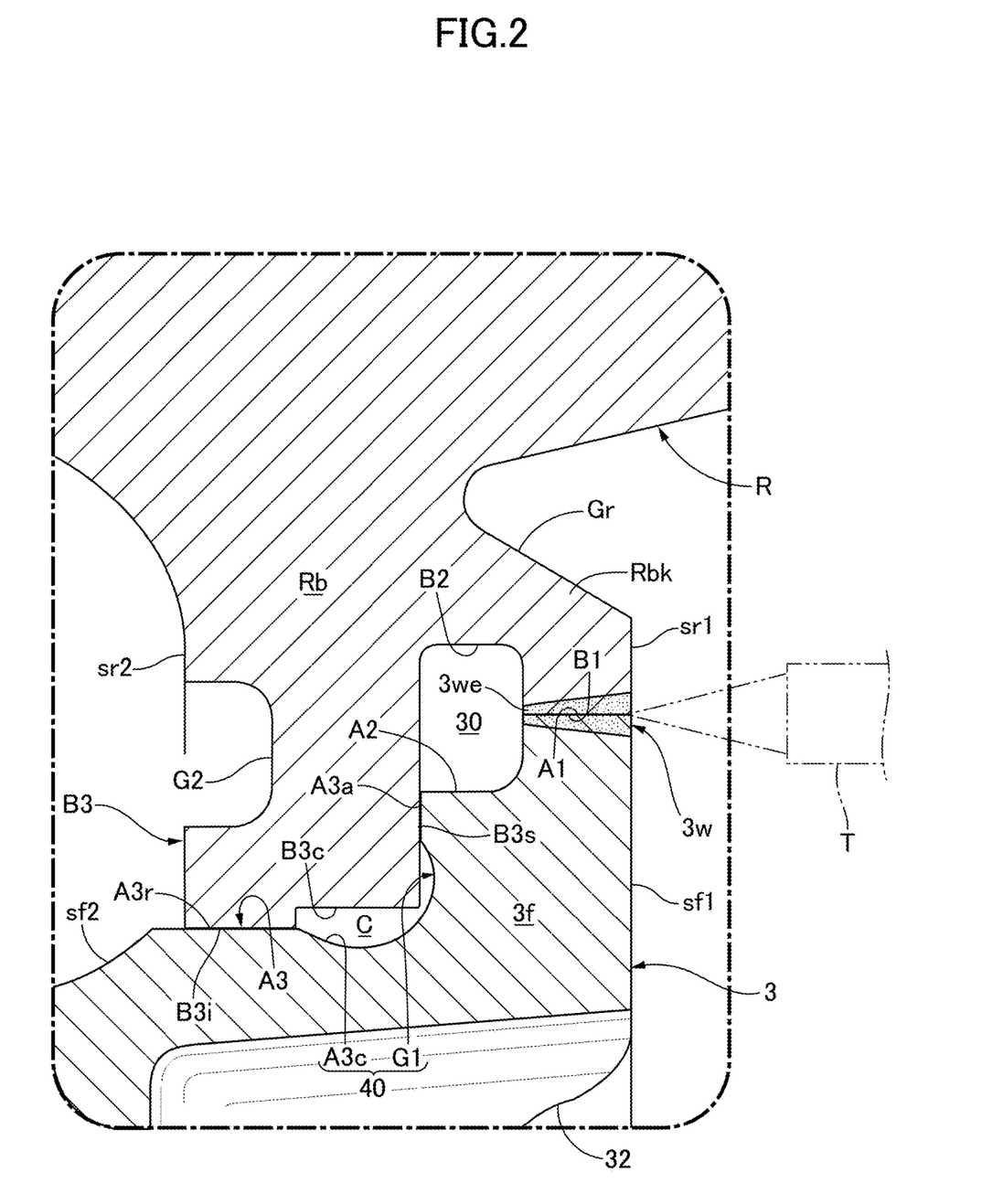
FIG. 2 is an enlarged sectional view of part 2 in FIG. 1.

First, in FIG. 1 and FIG. 2 showing a first embodiment, housed within a transmission case MC of a vehicle (for example, an automobile) is a differential device 10 that distributes and transmits power from a power source (for example, a vehicle-mounted engine), which is not illustrated, between a pair of axles S1, S2 as output shafts. The differential device 10 is one example of a power transmission device and, in the present embodiment, includes a metal differential case 3 and a differential gear mechanism 20 installed in the differential case 3.

The differential case 3 includes a hollow case main body 3c housing the differential gear mechanism 20 in its interior, first and second bearing bosses 3b1, 3b2 connectedly provided integrally with right and left parts of the case main body 3c and arranged on a first axis X1, and an annular flange portion 3f formed integrally with an outer peripheral part of the case main body 3c so as to face radially outward. The case main body 3c is formed into a substantially spherical shape, and an inner face 3ci is formed into a sphere around a center O of the differential case 3.

The first and second bearing bosses 3b1, 3b2 are rotatably supported on the transmission case MC around the first axis X1 via bearings 13, 14 on the outer peripheral sides of the bosses 3b1, 3b2. The left and right axles S1, S2 are rotatably fitted into and supported on inner peripheral faces of the first and second bearing bosses 3b1, 3b2.

Provided in one of mating faces between the bearing bosses 3b1, 3b2 and the axles S1, S2 are helical grooves 15, 16 that can exhibit a screw pump action that feeds lubricating oil within the transmission case MC into the differential case 3 accompanying rotation with respect to the other of the mating faces.

Fixed to the flange portion 3f of the differential case 3 using fixing means that combines welding and press fitting (or fitting) as described later is an inner peripheral part of a ring gear R, that is, a hub portion Rb. The flange portion 3f in the illustrated example is disposed offset toward one side in the axial direction (that is, the first bearing boss 3b1 side) from the center O of the case main body 3c. An annular depression 32 facing toward one side in the axial direction is formed between an outside face of the case main body 3c and the flange portion 3f in the offset direction.

The ring gear R has a short cylindrical rim portion Ra that has a helical gear-shaped tooth portion Rag on its outer periphery and the hub Rb, which is formed so as to be narrower in the axial direction than the rim portion Ra and is connectedly provided integrally with an inner peripheral side of the rim portion Ra, the tooth portion Rag meshing with a drive gear 50 that becomes an output part of a speed change device connected to the power source.

The rotational force from the drive gear 50 is transmitted to the case main body 3c of the differential case 3 via the ring gear R and the flange portion 3f. In FIG. 1, the tooth portion Rag is shown as a cross section along the line of the tooth in order to simplify illustration.

The differential gear mechanism 20 includes a pinion shaft 21 that is disposed on a second axis X2 orthogonal to the first axis X1 at the center O of the case main body 3c and is supported on the case main body 3c, a pair of pinion gears 22, 22 rotatably supported on the pinion shaft 21, and left and right side gears 23, 23 meshing with each pinion gear 22 and capable of rotating around the first axis X1. The two side gears 23, 23 function as output gears of the differential gear mechanism 20, and inner end parts of the left and right axles S1, S2 are spline fitted into inner peripheral faces of the two side gears 23, 23.

Respective back faces of the pinion gears 22 and side gears 23 are rotatably supported on the spherical inner face 3ci of the case main body 3c via a pinion gear washer Wp and a side gear washer Ws respectively (or directly without a washer). At least areas of the inner face 3c is a of the case main body 3c that become a pinion gear support face and a side gear support face are machined by a machining device such as a lathe through a working window H, which is described later, after casting of the differential case 3.

The pinion shaft 21 is inserted through and retained by a pair of pinion shaft support holes 3ch formed in an outer peripheral end part of the case main body 3c and extending on the second axis X2. Attached by insertion (for example, press fitted) into the case main body 3c is a retaining pin 17 that extends so as to transect one end part of the pinion shaft 21. The retaining pin 17 prevents the pinion shaft 21 from disengaging from the pinion shaft support hole 3ch.

The rotational force transmitted from the drive gear 50 to the case main body 3c of the differential case 3 via the ring gear R is distributed and transmitted to the pair of axles S1, S2 via the differential gear mechanism 20 while allowing differential rotation. Since the differential function of the differential gear mechanism 20 is conventionally well known, explanation thereof is omitted.

As shown by a dotted line in FIG. 1, the differential case 3 has a pair of the working windows H in a side wall of the case main body 3c further toward the other side in the axial direction (that is, second bearing boss 3b2 side) than the flange portion 3f. The pair of working windows H are disposed and formed symmetrically on opposite sides of a virtual plane including the first and second axes X1, X2. Each working window H is a window for allowing machining of the inner face 3ci of the case main body 3c or assembly of the differential gear mechanism 20 into the case main body 3c, and is formed into a shape that is sufficiently large for its purpose.

One example of a structure for fixing the hub portion Rb of the ring gear R to the flange portion 3f of the differential case 3 is now explained by reference in addition to FIG. 2.

The outer peripheral face of the flange portion 3f includes a first outer peripheral part A1 that extends further inward in the axial direction than a first side face sf1 on one side in the axial direction (that is, the first bearing boss 3b1 side) of the flange portion 3f and to which is fitted and welded a welded portion B1 of the inner periphery of the hub portion Rb, and a second outer peripheral part A2 that is adjacent to the axially inner end of the first outer peripheral part A1. An annular cavity part 30 having a rectangular cross section is formed between mutually opposing faces of the second outer peripheral part A2 and a cavity-forming part B2 that is recessed in the inner periphery of the hub portion Rb. The fitting between the first outer peripheral part A1 and the welded portion B1 prior to welding may be light press fitting or fitting without play.

The axially inner end of a weld portion 3w between the first outer peripheral part A1 and the hub portion Rb (more specifically the welded portion B1) faces the cavity part 30. The cavity part 30 is formed so as to extend at least further outward in the radial direction than the weld portion 3w (in the embodiment also further inward). The cavity part 30 can be utilized as degassing means that smoothly discharges gas produced in the weld portion 3w to the outside. The second outer peripheral part A2 in the illustrated example is stepped down inwardly in the radial direction from the first outer peripheral part A1 but may be continuous so as to be flush with the first outer peripheral part A1.

An outer peripheral face of the flange portion 3f has a positioning outer peripheral part A3 further toward the other side in the axial direction (that is, the second bearing boss 3b2 side) than the cavity part 30, and the positioning outer peripheral part A3 is formed as a shape that is stepped down inwardly in the radial direction from the axially inner end of the second outer peripheral part A2. Engaged with the positioning outer peripheral part A3 is a positioning projecting part B3 that is provided on the inner periphery of the hub portion Rb so as to project inward in the radial direction. Due to the engagement the hub portion Rb is positioned both in the radial and axial directions with respect to the flange portion 3f.

In order to carry out the positioning the positioning outer peripheral part A3 has a radial direction positioning face A3r that has an inner peripheral face B3i of the positioning projecting part B3 press fitted thereto in the axial direction so as to position the hub portion Rb in the radial direction with respect to the flange portion 3f, and an axial direction positioning face A3a that has a side face B3s, on the first outer peripheral part A1 side, of the positioning projecting part B3 abutted thereagainst so as to position the hub portion Rb in the axial direction with respect to the flange portion 3f. Instead of the radial direction positioning face A3r and the inner peripheral face B3i of the positioning projecting part B3 being press fitted as described above, they may be fitted without play.

The axial direction positioning face A3a extends inward in the radial direction from the axially inner end of the second outer peripheral part A2 on a virtual plane orthogonal to the first axis X1. The radial direction positioning face A3r is formed as a cylindrical face around the first axis X1 and is continuous from a second side face sf2 on the other side in the axial direction (that is, the second bearing boss 3b2 side) of the flange portion 3f.

The positioning outer peripheral part A3 has an annular concave face 40 that provides a continuous connection between a radially inner end part of the axial direction positioning face A3a and an axially inner end part of the radial direction positioning face A3r. The annular concave face 40 is now specifically explained.

That is, provided in the positioning outer peripheral part A3 is a first annular recess part G1 that is for reducing stress due to a pushing load produced by the positioning projecting part B3 pushing the radial direction positioning face A3r when the hub portion Rb receives a radially inward tensile force accompanying thermal shrinkage of the weld portion 3w between the first outer peripheral part A1 and the hub portion Rb. The first annular recess part G1 is provided so as to recess for example an area of the positioning outer peripheral part A3 that is adjacent to the radially inner end of the axial direction positioning face A3a further toward the weld portion 3w side in the axial direction than the axial direction positioning face A3a. Due to the first annular recess part G1 being specially provided the stress due to the pushing load can be reduced, thereby enabling residual stress produced in the axially inner end portion 3we of the weld portion 3w and a part therearound in relation to the hub portion Rb receiving a tensile force accompanying the thermal shrinkage to be alleviated.

Furthermore, further toward the weld portion 3w side in the axial direction than the radial direction positioning face A3r, an annular radial clearance C is disposed between mutually opposing faces of the positioning outer peripheral part A3 and the inner peripheral face B3i of the positioning projecting part B3, the radial clearance C putting the mutually opposing faces out of contact with each other, and this radial clearance C communicates directly with the interior space of the annular recess part G1.

The radial clearance C is formed by setting back a part B3c (that is, a part closer to the weld portion 3w in the axial direction) of the positioning projecting part B3 further outward in the radial direction than the radial direction positioning face A3r. Moreover, the radial clearance C is also formed by setting back a part A3c (that is, a part closer to the weld portion 3w in the axial direction than the radial direction positioning face A3r) of the positioning outer peripheral part A3 further inward in the radial direction than the radial direction positioning face A3r, and the part A3c and the first annular recess part G1 are smoothly continuous, thus forming one continuous annular concave face 40 that is relatively wide overall.

A second annular recess part G2 is provided in a side face sr2, on the other side in the axial direction, of the hub portion Rb so that at least part thereof overlaps the positioning projecting part B3, the second annular recess part G2 reducing a pushing load via which the positioning projecting part B3 pushes the radial direction positioning face A3r due to the hub portion Rb receiving a radially inward tensile force accompanying the thermal shrinkage of the weld portion 3w. Since the pushing load can also be reduced by specially providing the second annular recess part G2, the residual stress produced in the axially inner end portion 3we of the weld portion 3w and a part therearound in relation to the hub portion Rb receiving a tensile force accompanying the thermal shrinkage can be further alleviated.

A substantially V-shaped annular groove Gr that is axially inwardly concave is recessed in a first side face sr1 on one side in the axial direction (that is, the first bearing boss 3b1 side) of the hub portion Rb so that the axial position of the annular groove Gr and the axial position of the cavity part 30 are made to partially coincide with each other (and therefore sufficiently deeply). Moreover, as is clearly shown in FIG. 2 in particular, a narrowed portion Rbk that is slightly narrowed when viewed in a cross section transecting the annular groove Gr (in other words, a cross section including the first axis X1) is formed partway along a portion of the hub portion Rb sandwiched between the annular groove Gr and the cavity part 30 and weld portion 3w.

The operation of the first embodiment is now explained.

The differential case 3 is cast from a metal material (for example, aluminum, aluminum alloy, cast iron, etc.), and after being cast a predetermined area (for example, the inner face 3ci of the case main body 3c, inner and outer peripheries within the bearing bosses 3b1, 3b2, the flange portion 3f, the pinion shaft support hole 3ch, etc.) of an inner face or an outer face of the differential case 3 is subjected to machining processing.

Each element of the differential gear mechanism 20 is assembled through the working window H into the differential case 3, for which the machining processing has been completed, and an inner peripheral part of the hub portion Rb of the ring gear R, on which the tooth portion Rag has been formed in advance, is joined to the flange portion 3f of the differential case 3 by the use of press fitting and welding in combination.

The process of joining the ring gear R is now explained. First, the welded portion B1 of the hub portion Rb of the ring gear R is fitted onto the first outer peripheral part A1 of the flange portion 3f, at the same time the inner peripheral face B3i of the positioning projecting part B3 of the hub portion Rb is press fitted onto the radial direction positioning face A3r of the third outer peripheral part A3, and the inside face B3s of the positioning projecting part B3 is abutted against the axial direction positioning face A3a of the third outer peripheral part A3. Positioning of the hub portion Rb in both the radial direction and the axial direction with respect to the flange portion 3f is thus carried out.

Subsequently, the fitted part between the welded portion B1 of the hub portion Rb and the first outer peripheral part A1 of the flange portion 3f is welded. This welding process is carried out for example as shown by the chain line in FIG. 2 by irradiating the outer end of the fitted part between the first outer peripheral part A1 of the flange portion 3f and the welded portion B1 of the hub portion Rb with a laser from a welding laser torch T, and the irradiated area is gradually moved to the entire periphery of the outer end of the fitted part.

In this way, the inner peripheral part of the hub portion Rb of the ring gear R is strongly joined to the flange portion 3f of the differential case 3 via a predetermined position using press fitting and welding in combination.

FIG. 4 shows a comparative example that does not have the technical aspects of the present invention (the first and second annular recess parts G1, G2). In this arrangement, since the weld portion 3w between the flange portion 3f of the differential case 3 as a transmission case (transmission member) and the hub portion Rb of the ring gear R undergoes thermal expansion at the time of welding, and then undergoes thermal shrinkage after the welding, the hub portion Rb in particular receives a large tensile force from the flange portion 3f toward the weld portion 3w side, that is, inward in the radial direction. The tensile force pushes the positioning projecting part B3 on the inner periphery of the hub portion Rb against the positioning outer peripheral part A3 of the flange portion 3f, displacement of the positioning projecting part B3 is strongly restricted by the positioning outer peripheral part A3, and there is therefore a tendency for a relatively high residual stress to be produced in the axially inner end portion 3we of the weld portion 3w and a part therearound, which is the origin of tension in the hub portion Rb (see residual stress distribution of FIG. 4).

Figure 3:
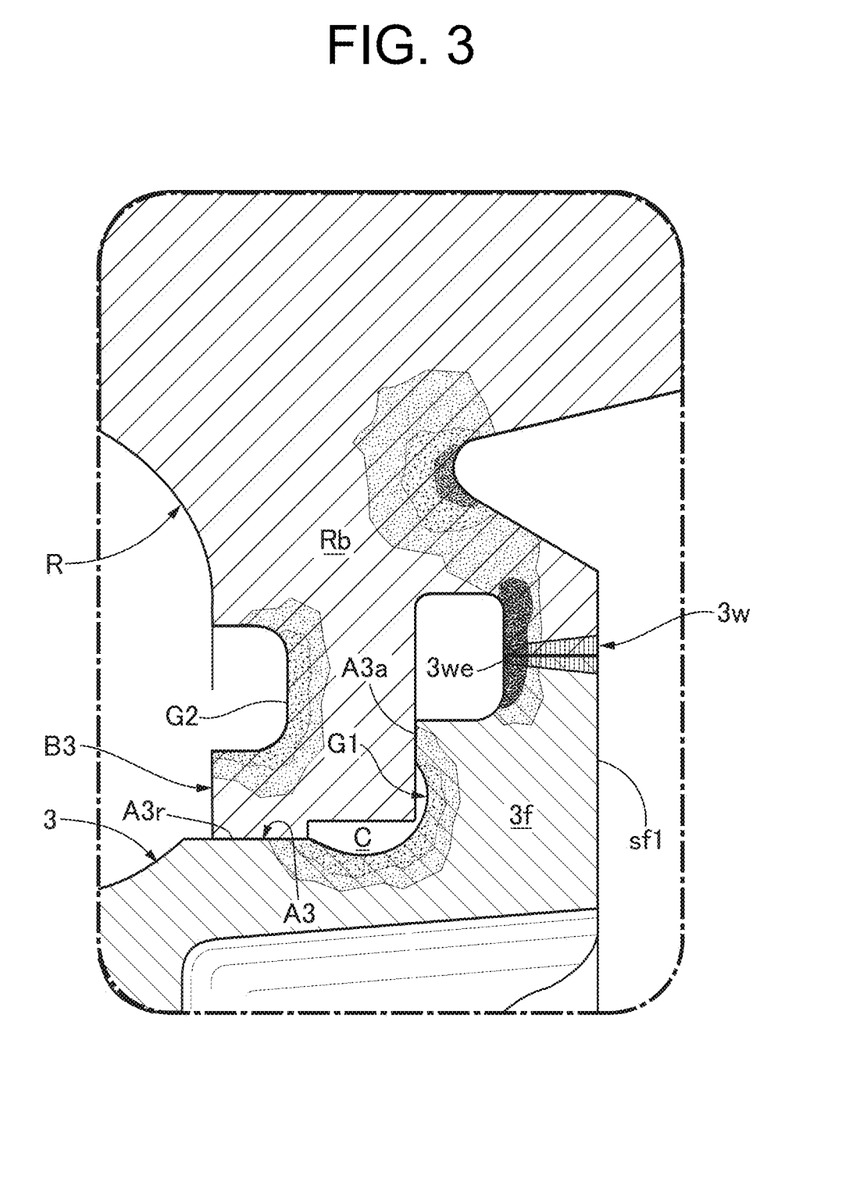
FIG. 3 is a sectional view, corresponding to FIG. 2, showing residual stress distribution of a differential case in a state in which cooling is completed after welding, determined by computer simulation analysis.

On the other hand, in accordance with the present embodiment, provided in the positioning outer peripheral part A3 so as to be recessed further toward the weld portion 3w side in the axial direction than the axial direction positioning face A3a is the first annular recess part G1, which reduces stress due to a pushing load caused by the positioning projecting part B3 pushing the radial direction positioning face A3r due to the hub portion Rb receiving the tensile force accompanying thermal shrinkage of the weld portion 3w. That is, the rigidity of the flange portion 3f, which pulls the hub portion Rb with the weld portion 3w sandwiched therebetween, is to some degree decreased by the first annular recess part G1, and a force that is transmitted from the radial direction positioning face A3r, to which the pushing load is applied, toward the axially inner end portion 3we side of the weld portion 3w via the positioning outer peripheral part A3 is reduced by the first annular recess part G1, thus alleviating stress in the vicinity of the weld portion 3w caused by the pushing load. As is clear from FIG. 3, this enables residual stress in the axially inner end portion 3we of the weld portion 3w and a part therearound, which is prominent in the comparative example, to be alleviated.

Furthermore, the second annular recess part G2, which reduces the pushing load via which the positioning projecting part B3 pushes the radial direction positioning face A3r accompanying thermal shrinkage of the weld portion 3w, is provided in the side face sr2, on the other side in the axial direction, of the hub portion Rb so as to at least partially overlap the positioning projecting part B3. That is, rigidity of the positioning projecting part B3 can be reduced to some degree by the second annular recess part G2, the pushing load can consequently be decreased, and as is clear from FIG. 3 this enables residual stress in the axially inner end portion 3we of the weld portion 3w and a part therearound, which is prominent in the comparative example, to be further alleviated.

Moreover, the second annular recess part G2 is present at a position in which it partially coincides with the radial direction positioning face A3r in the axial direction. Because of this, a part, corresponding to the radial direction positioning face A3r, of the positioning projecting part B3 on which the reaction force directly acts when the positioning projecting part B3 imposes the pushing load upon the radial direction positioning face A3r (in particular, a part coinciding with the second annular recess part G2 in the axial direction) is easily distorted and deformed by the second annular recess part G2 being specially provided, and it is therefore possible to further alleviate residual stress produced in the inner end portion 3we of the weld portion 3w and a part therearound.

As a result, it becomes possible to prevent effectively the occurrence of delayed fracture due to high residual stress in the flange portion 3f of the differential case 3, in particular the axially inner end portion 3we of the weld portion 3w and a part therearound.

Furthermore, in the present embodiment, the annular radial clearance C is disposed between the mutually opposing faces of the positioning outer peripheral part A3 and the inner peripheral face B3i of the positioning projecting part B3 further toward the weld portion 3w side in the axial direction than the radial direction positioning face A3r, the annular radial clearance C puts the mutually opposing faces out of contact with each other, and it is therefore possible to space the weld portion 3w and the inner end, on the weld portion 3w side, of the radial direction positioning face A3r from each other in the axial direction. Because of this, even if the positioning projecting part B3 receives a large pushing reaction force from the radial direction positioning face A3r, the stress is dispersed over a relatively long region in the axial direction from a portion of the positioning projecting part B3 that abuts against the radial direction positioning face A3r to the weld portion 3w, and it becomes possible to alleviate effectively residual stress produced in the axially inner end portion 3we of the weld portion 3w and a part therearound.

In particular, the radial clearance C is formed by setting back the part B3c (that is, a part closer to the weld portion 3w in the axial direction) of the positioning projecting part B3 further outward in the radial direction than the radial direction positioning face A3r, the contact area between the inner peripheral face B3i of the positioning projecting part B3 and the radial direction positioning face A3r can be decreased by an area corresponding to the setting back, and the inner peripheral face B3i can thus be easily distorted in the compression direction, thus enabling the pushing reaction force to be absorbed and thereby further dispersing the stress in the positioning projecting part B3. This enables the occurrence of residual stress in the axially inner end portion 3we of the weld portion 3w and a part therearound to be alleviated effectively.

Moreover, the radial clearance C is formed also by setting back the part A3c (that is, a part closer to the weld portion 3w than the radial direction positioning face A3r in the axial direction) of the positioning outer peripheral part A3 further inward in the radial direction than the radial direction positioning face A3r, and communicates directly with the interior of the first annular recess part G1. This enables the first annular recess part G1, which is set back further toward the weld portion 3w side than the axial direction positioning face A3a in the axial direction, and the radial clearance C (in particular, the part A3c, further recessed than the radial direction positioning face A3r, of the positioning outer peripheral part A3), which is set back further inward in the radial direction than the radial direction positioning face A3r, to be easily formed as one continuous annular concave face 40.

Figure 5:
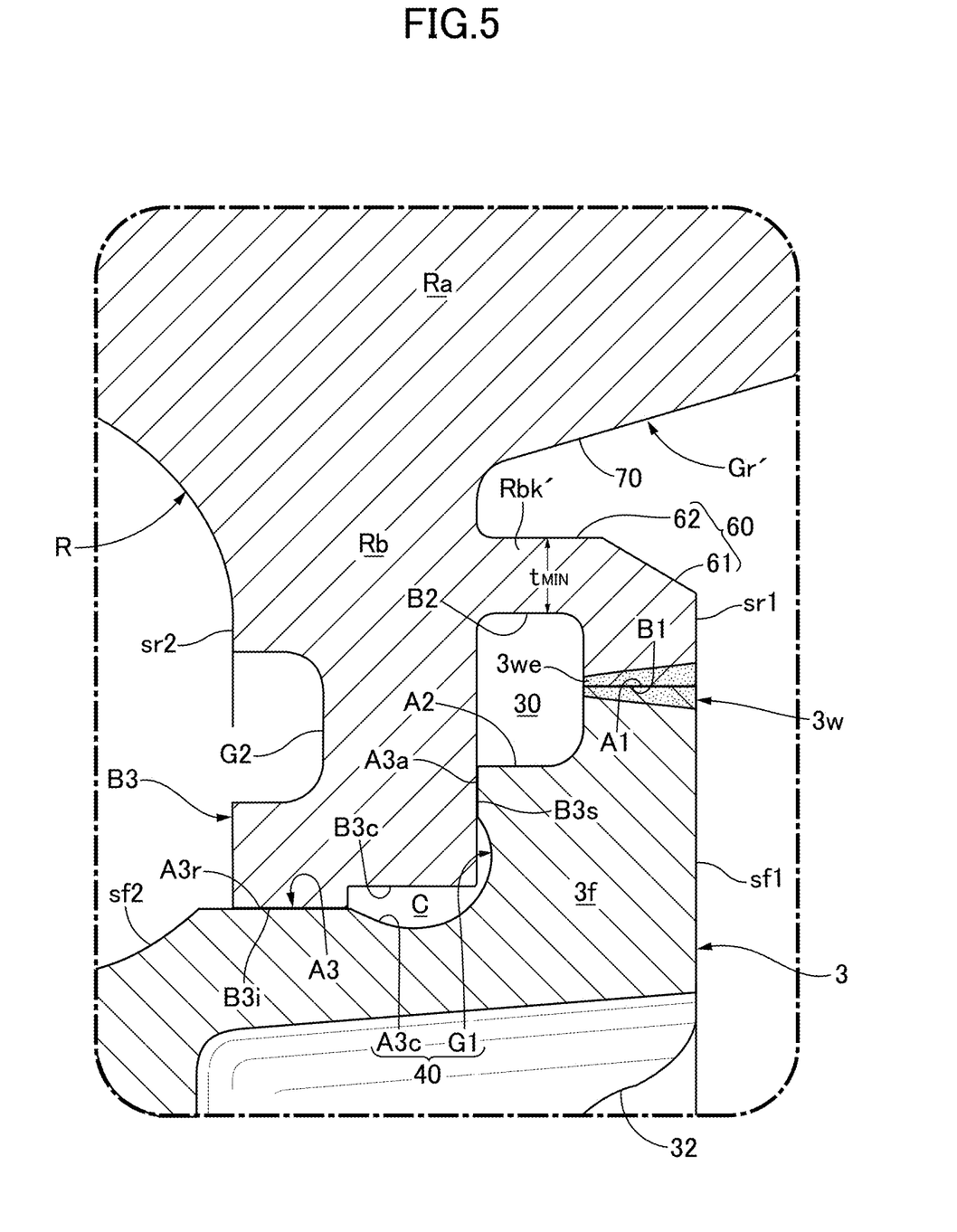
FIG. 5 is a sectional view (a view corresponding to FIG. 2) showing an essential part of a differential device related to a second embodiment.

A second embodiment is now explained by reference to FIG. 5. The first embodiment shows one in which the annular groove Gr, which is recessed relatively deeply in the first side face sr1 of the hub portion Rb, has a substantially V-shaped form, and a portion of the hub portion Rb sandwiched between the annular groove Gr and the cavity part 30 and weld portion 3w is slightly narrowed partway along when viewed in a cross section transecting the annular groove Gr, but in the second embodiment an annular groove Gr' that is recessed in the first side face sr1 of the hub portion Rb is formed more deeply than that of the first embodiment.

An inside face 60 on one side of the annular groove Gr' (the inner side in the radial direction) is formed so that an inside face 61, which is the open side half connected to the first side face sr1, is chamfered into a taper shape and an inside face 62, which is the blocked side half, is formed into a cylindrical face around the first axis X1.

Therefore, even if the thickness of the ring gear R on the inside face 70 side on the other side (the outer side in the radial direction) of the annular groove Gr' is increased in order to strengthen the ring gear R, it is possible, particularly due to the inside face 62, which is the half on the blocked side, being a cylindrical face, to ensure a sufficient gap in the radial direction between itself and the inside face 70. The annular groove Gr' can therefore be formed sufficiently deeply while enabling its bottom part to be machined so as to have a required round face. Moreover, a portion of the hub portion Rb sandwiched between the cavity part 30 and the inside face 62, which is the half on the blocked side of the annular groove Gr', becomes a narrowed portion Rbk' extending in the axial direction. The narrowed portion Rbk' has a minimum thickness $t_{MIN}$ that is set to be no greater than the axial length of the weld portion 3w and set to be smaller than the maximum width both in the radial and axial directions of the cavity part 30.

In accordance with the narrowed portion Rbk' being specially provided, since the rigidity of a part around the weld portion $3w$ of the hub portion Rb can be appropriately weakened to thus enable it to be easily flexed, it becomes possible to alleviate more effectively residual stress produced in the weld portion $3w$ of the flange portion $3f$ and a part therearound by thermal shrinkage of the weld portion $3w$.

The structure of the second embodiment is otherwise basically the same as that of the first embodiment, and constituent elements of the second embodiment are denoted by the same reference numerals and symbols as those of the corresponding constituent elements of the first embodiment, further explanation of the structure being omitted. The second embodiment can also achieve basically the same operational effects as those of the first embodiment.

Figure 6:
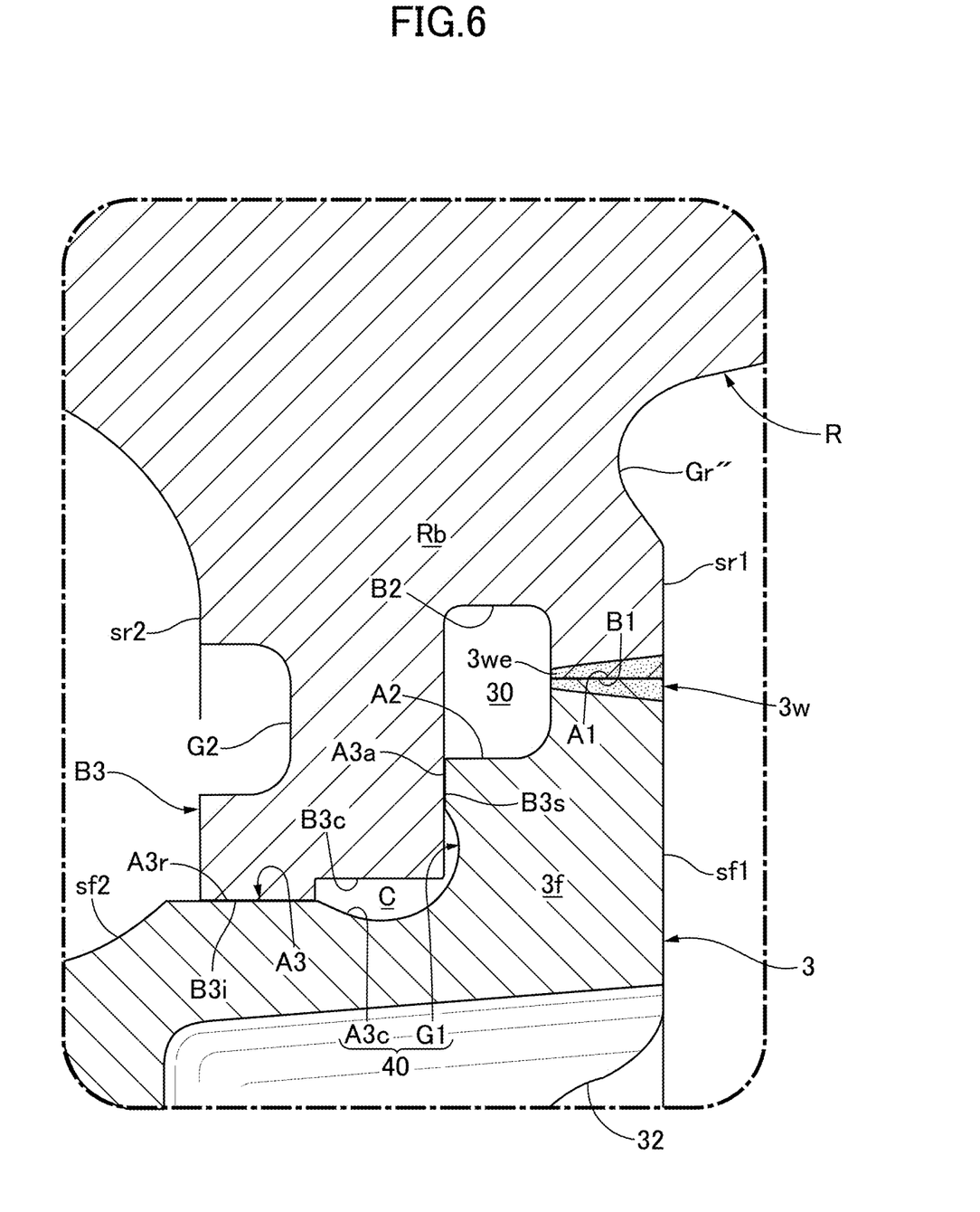
FIG. 6 is a sectional view (a view corresponding to FIG. 2) showing an essential part of a differential device related to a third embodiment.

A third embodiment is now explained by reference to FIG. 6. The third embodiment is different in that an annular groove Gr" recessed in the first side face sr1 of the hub portion Rb is formed so as to be shallower than that of the first embodiment and has an arc-shaped cross section.

The structure of the third embodiment is otherwise basically the same as that of the first embodiment, and constituent elements of the third embodiment are denoted by the same reference numerals and symbols as those of the corresponding constituent elements of the first embodiment, further explanation of the structure being omitted. The third embodiment can also achieve basically the same operational effects as those of the first embodiment.

Embodiments of the present invention are explained above, but the present invention is not limited to the embodiments and may be modified in a variety of ways as long as the modifications do not depart from the subject matter.

For example, the embodiments illustrate a case in which the differential device 10 as a power transmission device is implemented as a vehicle differential device, in particular a differential device between left and right driven wheels, but in the present invention the differential device 10 may be implemented as a differential device between front and rear driven wheels or may be implemented as a differential device in various types of machines and devices other than vehicles.

Furthermore, the present invention may be applied to a power transmission device other than a differential device (for example, a speed reduction device, a speed increase device, a speed change device, etc.), and in this case a rotating case or a rotating member serving to transmit torque of the power transmission device becomes the transmission case or the transmission member.

Moreover, the embodiments illustrate a case in which the tooth portion Rag of the ring gear R is a helical gear, but the ring gear of the present invention may be another gear having a tooth shape that receives a thrust load in a direction along the first axis X1 due to meshing with the drive gear 50 (for example, a bevel gear, a hypoid gear, etc.). Alternatively, it may be a gear having a tooth shape that does not receive the thrust load due to meshing with the drive gear 50 (for example, a spur gear).

Furthermore, the embodiments illustrate a case in which the hub portion Rb of the ring gear R having the tooth portion Rag formed in advance is joined to the flange portion $3f$ of the differential case 3, but the ring gear R may be joined to the hub portion Rb prior to the tooth portion Rag being formed, and after that the tooth portion Rag may be formed.

Moreover, the embodiments illustrate a case in which welding between the flange portion $3f$ and the hub portion Rb employs laser welding, but in the present invention another welding method (for example, electron beam welding, etc.) may be used.

Furthermore, the embodiments illustrate a case in which both the first and second annular recess parts G1, G2 are provided, but it has been confirmed that a certain effect (that is, an effect that enables residual stress produced in the axially inner end portion $3we$ of the weld portion $3w$ to be alleviated) can be obtained even when only either one of the first and second annular recess parts G1, G2 is provided. Therefore, another embodiment in which only either one of the first and second annular recess parts G1, G2 is provided can be implemented.

The invention claimed is:

1. A power transmission device comprising a transmission member that has a radially outward facing flange portion on an outer periphery thereof and is rotatable, and a ring gear that has on an inner periphery thereof a hub portion surrounding the flange portion, an outer peripheral face of the flange portion having at least a first outer peripheral part that extends further inward in an axial direction than a side face, on one side in the axial direction, of the flange portion and has fitted and welded thereto an inner peripheral face of the hub portion, and a positioning outer peripheral part with which a positioning projecting part projectingly provided on an inner peripheral face of the hub portion is engaged further on the other side in the axial direction than the first outer peripheral part, wherein the positioning outer peripheral part has at least a radial direction positioning face that has fitted or press fitted thereto an inner peripheral face of the positioning projecting part so as to position the hub portion in a radial direction with respect to the flange portion, and an axial direction positioning face against which a side face, on the first outer peripheral part side, of the positioning projecting part abuts so as to position the hub portion in the axial direction with respect to the flange portion, a first annular recess part is provided in the positioning outer peripheral part so as to be recessed at least further toward a weld portion side in the axial direction than the axial direction positioning face, the first annular recess part alleviating stress caused by a pushing load via which the positioning projecting part pushes the radial direction positioning face due to the hub portion receiving a tensile force inward in the radial direction accompanying thermal shrinkage of the weld portion between the first outer peripheral part and the hub portion, and residual stress produced in an axially inner end portion of the weld portion in relation to the hub portion receiving the tensile force accompanying the thermal shrinkage can be alleviated by the first annular recess part reducing the stress due to the pushing load.

2. The power transmission device according to claim 1, wherein a radial clearance is disposed between mutually opposing faces of the positioning outer peripheral part and the inner peripheral face of the positioning projecting part further toward the weld portion side in the axial direction than the radial direction positioning face, the radial clearance putting the mutually opposing faces out of contact with each other.

3. The power transmission device according to claim 2, wherein the radial clearance is formed by setting back a part of the positioning projecting part further outward in the radial direction than the radial direction positioning face.

4. The power transmission device according to claim 1, wherein a radial clearance is disposed, further toward the weld portion side in the axial direction than the radial direction positioning face, between mutually opposing faces of the positioning outer peripheral part and the inner peripheral face of the positioning projecting part, the radial clearance putting the mutually opposing faces out of contact with each other, and the radial clearance is formed by setting back a part of the positioning outer peripheral part further inward in the radial direction than the radial direction positioning face and communicates directly with the first annular recess part.

5. A power transmission device comprising a transmission member that has a radially outward facing flange portion on an outer periphery thereof and is rotatable, and a ring gear that has on an inner periphery thereof a hub portion surrounding the flange portion, an outer peripheral face of the flange portion having at least a first outer peripheral part that extends further inward in an axial direction than a side face, on one side in the axial direction, of the flange portion and has fitted and welded thereto an inner peripheral face of the hub portion, and a positioning outer peripheral part with which a positioning projecting part projectingly provided on an inner peripheral face of the hub portion is engaged further on the other side in the axial direction than the first outer peripheral part, wherein the positioning outer peripheral part has at least a radial direction positioning face that has fitted or press fitted thereto an inner peripheral face of the positioning projecting part so as to position the hub portion in a radial direction with respect to the flange portion, and an axial direction positioning face against which a side face, on the first outer peripheral part side, of the positioning projecting part abuts so as to position the hub portion in the axial direction with respect to the flange portion, a second annular recess part is provided in a side face, on the other side in the axial direction, of the hub portion so that at least part thereof overlaps the positioning projecting part, the second annular recess part alleviating a pushing load via which the positioning projecting part pushes the radial direction positioning face due to the hub portion receiving a tensile force inward in the radial direction accompanying thermal shrinkage of a weld portion between the first outer peripheral part and the hub portion, and residual stress produced in an axially inner end portion of the weld portion in relation to the hub portion receiving the tensile force accompanying the thermal shrinkage can be alleviated by the second annular recess part reducing the pushing load.

6. The power transmission device according to claim 5, wherein the second annular recess part partially coincides with the radial direction positioning face in the axial direction.

7. The power transmission device according to claim 5, wherein a radial clearance is disposed between mutually opposing faces of the positioning outer peripheral part and the inner peripheral face of the positioning projecting part further toward the weld portion side in the axial direction than the radial direction positioning face, the radial clearance putting the mutually opposing faces out of contact with each other.

8. The power transmission device according to claim 7, wherein the radial clearance is formed by setting back a part of the positioning projecting part further outward in the radial direction than the radial direction positioning face.

* * * * *